US010227058B2

(12) United States Patent
Masaki (10) Patent No.: US 10,227,058 B2
(45) Date of Patent: Mar. 12, 2019

(54) VEHICLE STATE MONITORING DEVICE AND VEHICLE STATE MONITORING SYSTEM

(71) Applicant: OMRON Corporation, Kyoto-shi, Kyoto (JP)

(72) Inventor: Tatsuakira Masaki, Nara (JP)

(73) Assignee: OMRON Corporation, Kyoto-shi (JP)

(*) Notice: Subject to any disclaimer, the term of this patent is extended or adjusted under 35 U.S.C. 154(b) by 0 days.

(21) Appl. No.: 15/528,527

(22) PCT Filed: Nov. 17, 2015

(86) PCT No.: PCT/JP2015/082272
§ 371 (c)(1),
(2) Date: May 22, 2017

(87) PCT Pub. No.: WO2016/093026
PCT Pub. Date: Jun. 16, 2016

(65) Prior Publication Data
US 2018/0251097 A1    Sep. 6, 2018

(30) Foreign Application Priority Data
Dec. 10, 2014 (JP) .................. 2014-250202

(51) Int. Cl.
*B60R 25/102* (2013.01)
*G08B 13/02* (2006.01)
(Continued)

(52) U.S. Cl.
CPC ............ *B60R 25/102* (2013.01); *B60R 25/40* (2013.01); *B60R 25/403* (2013.01); *B62H 5/20* (2013.01);
(Continued)

(58) Field of Classification Search
CPC ..... B60R 25/102; B60R 25/40; B60R 25/403; B62H 5/20; G08B 13/02; G08B 21/00; G08B 21/0297; G08B 25/08; H02N 1/08
See application file for complete search history.

(56) References Cited

U.S. PATENT DOCUMENTS

2004/0246111 A1   12/2004  Oyagi et al.
2006/0176158 A1    8/2006  Fleming
(Continued)

FOREIGN PATENT DOCUMENTS

CN      1610624 A     4/2005
CN    102640411 A     8/2012
(Continued)

OTHER PUBLICATIONS

The extended European search report dated Jan. 22, 2018 in a counterpart European patent application.
(Continued)

*Primary Examiner* — Leon Flores
(74) *Attorney, Agent, or Firm* — Metrolexis Law Group, PLLC (57) ABSTRACT

One aspect of the present invention is a vehicle state monitoring device including: a transmission unit configured to wirelessly transmit a state signal providing a notification of a vehicle state; a power generator fixed to the vehicle body, and comprising a vibration power generation element configured to perform vibration power generation by vibration from the vehicle body; and a controller configured to start up the transmission unit when power generated by the vibration power generation is supplied from the power generator, and configured to wirelessly transmit the state signal to the transmission unit.

7 Claims, 8 Drawing Sheets

(51) Int. Cl.
  *G08B 21/00* (2006.01)
  *G08B 25/08* (2006.01)
  *B60R 25/40* (2013.01)
  *B62H 5/20* (2006.01)
  *G08B 21/02* (2006.01)
  *H02N 1/08* (2006.01)
  *B62J 99/00* (2009.01)

(52) U.S. Cl.
  CPC ............ *G08B 13/02* (2013.01); *G08B 21/00* (2013.01); *G08B 21/0297* (2013.01); *G08B 25/08* (2013.01); *H02N 1/08* (2013.01); *B60R 2325/20* (2013.01); *B62J 99/00* (2013.01)

(56) References Cited

U.S. PATENT DOCUMENTS

| | | |
|---|---|---|
| 2007/0075847 A1 | 4/2007 | Oyagi et al. |
| 2008/0027794 A1 | 1/2008 | Le Gars et al. |
| 2008/0048521 A1 | 2/2008 | Mabuchi et al. |
| 2011/0260831 A1 | 10/2011 | Ieda et al. |
| 2013/0134830 A1 | 5/2013 | Ikuta et al. |
| 2014/0148103 A1 | 5/2014 | Honda et al. |

FOREIGN PATENT DOCUMENTS

| | | |
|---|---|---|
| CN | 103650353 A | 3/2014 |
| EP | 1522981 A2 | 4/2005 |
| JP | 2002-166823 A | 6/2002 |
| JP | 2007-015567 A | 1/2007 |
| JP | 2008-117423 A | 5/2008 |
| JP | 2008-123435 A | 5/2008 |
| JP | 2010-163756 A | 7/2010 |
| JP | 2010-175475 A | 8/2010 |
| JP | 2013-158117 A | 8/2013 |
| JP | 2014-058278 A | 4/2014 |
| JP | 2014-137705 A | 7/2014 |
| WO | 2010/149753 A1 | 12/2010 |

OTHER PUBLICATIONS

The office action dated Jul. 20, 2018 in a counterpart Chinese patent application.
Japanese office action dated Jan. 22, 2019 in a counterpart Japanese patent application.

| Identification information | Time information | Positional information |
|---|---|---|
| aaa-bbb01 | 2014-11-01 11:03 | 139-45,35-41 |
| aaa-bbb02 | 2014-11-02 09:14 | 139-19,35-40 |

FIG. 10

| Identification information | Contact address |
|---|---|
| aaa-bbb01 | aaa@foo.bar |
| aaa-bbb02 | hoge@foo.bar |

320

VEHICLE STATE MONITORING DEVICE AND VEHICLE STATE MONITORING SYSTEM

TECHNICAL FIELD

The present invention relates to a vehicle state monitoring device and a vehicle state monitoring system.

BACKGROUND ART

A state monitoring device that monitors a vehicle state has been used. For example, when detecting a vehicle theft, the state monitoring device notifies a vehicle owner of the vehicle theft. Almost all the state monitoring devices operate while receiving power from a secondary battery. In the case that the state monitoring device is mounted on a vehicle not provided with a secondary battery, the secondary battery is provided in the state monitoring device (for example, see Patent Documents 1 to 3).

PRIOR ART DOCUMENTS

Patent Documents

Patent Document 1: Japanese Unexamined Patent Publication No. 2014-137705
Patent Document 2: Japanese Unexamined Patent Publication No. 2014-058278
Patent Document 3: Japanese Unexamined Patent Publication No. 2007-015567

SUMMARY OF THE INVENTION

Problems to be Solved by the Invention

However, for the use of the state monitoring device in which the secondary battery is provided, trouble to charge the secondary battery is generated to pose inconvenience for a user. An object of the present invention is to provide a vehicle state monitoring device that can easily be mounted on the vehicle not provided with the secondary battery.

Means for Solving the Problem

The present invention is configured to solve the problem. That is, the present invention is the following vehicle state monitoring device. The vehicle state monitoring device includes a transmission unit, a power generator, and a controller. The transmission unit wirelessly transmits a state signal providing a notification of a vehicle state. The power generator is fixed to a vehicle body of the vehicle, and includes a vibration power generation element configured to perform vibration power generation by vibration received from the vehicle body. The controller starts up the transmission unit when power generated by the vibration power generation is supplied from the power generator, and the transmission unit wirelessly transmits the state signal.

In the vehicle state monitoring device of the present invention, when the power generated by the vibration power generation is supplied from the power generator that performs the vibration power generation by the vehicle vibration to the controller, the controller starts up the transmission unit, and the started-up transmission unit wirelessly transmits the state signal. Therefore, the vehicle state monitoring device can easily be mounted on the vehicle not provided with the secondary battery.

The vehicle state monitoring device of the present invention may have the following feature. A vibration direction of the vibration power generation element agrees with a running direction of the vehicle. As described later, in the vibration generated in the running vehicle body, a component of the vibration direction agreeing with the running direction of the vehicle is larger than components of other directions. Accordingly, the vibration direction of the vibration power generation element agrees with the running direction of the vehicle, which allows the vibration power generation element to efficiently generate the power.

The vehicle state monitoring device of the present invention may have the following feature. A resonance frequency of the vibration power generation element ranges from 3 Hz to 70 Hz. As described later, in the running vehicle, a large vibration is detected in a frequency range of 3 Hz to 70 Hz. Accordingly, a resonance frequency of the vibration power generation element agrees with a frequency range in which a strong vibration is detected in the vehicle. Therefore, the vibration power generation element can efficiently generate the power.

The vehicle state monitoring device of the present invention may have the following feature. The vehicle state monitoring device further includes an acceleration sensor configured to measure vehicle acceleration. The transmission unit transmits the vehicle acceleration detected with the acceleration sensor while adding the vehicle acceleration to the state signal. Accordingly, running of the vehicle can be monitored in detail by the transmission of the state signal to which the vehicle acceleration detected with the acceleration sensor is added.

The vehicle state monitoring device of the present invention may have the following feature. The vehicle state monitoring device further includes the secondary battery configured to the acceleration sensor. Accordingly, the vehicle state monitoring device can be provided with the acceleration sensor requiring the power that is not provided for by the vibration power generation.

The vehicle state monitoring device of the present invention may have the following feature. The power generator includes a storage battery configured to accumulate the power of the vibration power generation, and the secondary battery is charged with the power accumulated in the storage battery. Accordingly, the secondary battery is charged with the power generated by the vibration power generation, which allows a user to save trouble in charging the secondary battery.

The present invention may be the following vehicle state monitoring system. A vehicle state monitoring system includes: a server; the vehicle state monitoring device of the present invention; a relay device; and a terminal device. When receiving the state signal transmitted from the state monitoring device, the relay device transmits state information in which time information indicating time the state signal is received and positional information indicating a position of the relay device are added to the received state signal to the server. The server stores the received state information in a database, and the terminal device accesses the server to acquire the state information stored in the database. Accordingly, the relay device provides the positional information about the vehicle and the time information. Therefore, the vehicle information including the position and time can be stored in the server. Additionally, power consumption of the vehicle state monitoring device can be reduced because a unit that acquires the positional information and time information from the vehicle state monitoring device is eliminated.

The present invention may be the following vehicle state monitoring system. The state signal includes identification information that is uniquely assigned to each state monitoring device, the server further comprises a contact address information holding unit configured to store the state information and contact address information including the contact address of a vehicle user while associating the identification information and the contact address information and contact address information holding unit with each other, and when receiving the state information from the relay device, the server searches the contact address information holding unit with the state signal included in the state information as a key, and notifies the contact address included in the contact address information associated with the state signal. Accordingly, the server that receives the state signal notifies the previously-registered contact address. Therefore, the vehicle state monitoring system of the present invention can early notify the user of the vehicle state.

Effect of the Invention

The present invention can provide the vehicle state monitoring device that can easily be mounted on the vehicle not provided with the secondary battery.

MODE FOR CARRYING OUT THE INVENTION

Hereinafter, a vehicle theft monitoring device according to an embodiment will be described with reference to the drawings. The following configuration of the embodiment is illustrated only by way of example, but the present invention is not limited to the configuration of the embodiment.
<Embodiment>

In the vehicle theft monitoring device of the embodiment, it is assumed that a monitoring target is a bicycle theft, and that the theft monitoring device is fixed to a bicycle body. The theft monitoring device is an example of the state monitoring device of the present invention.

Figure 1:
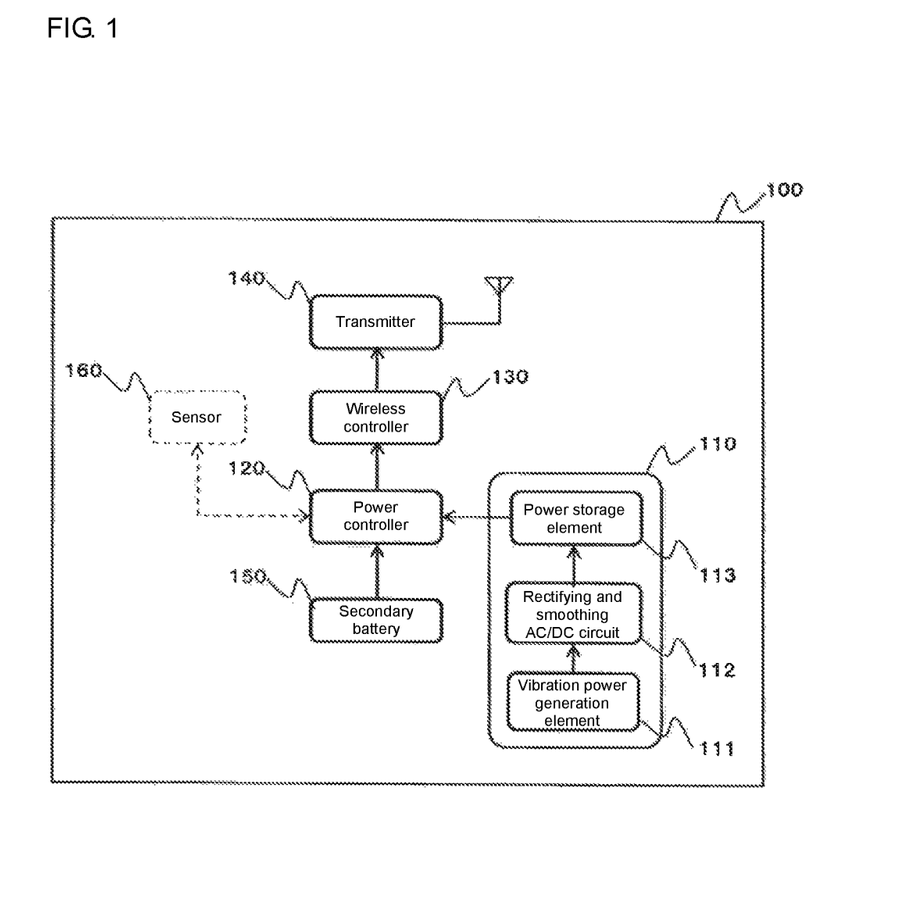
FIG. 1 is a view illustrating an example of a configuration of a theft monitoring device.

FIG. 1 is a view illustrating an example of a configuration of a theft monitoring device 100. The theft monitoring device 100 includes a power generation unit 110, a power controller 120, a wireless controller 130, and a transmitter 140. The theft monitoring device 100 may further include a secondary battery 150 and an acceleration sensor 160.

The theft monitoring device 100 is started up with supply of power from the power generation unit 110 to the power controller 120 as a trigger. The started-up theft monitoring device 100 wirelessly transmits a theft signal indicating theft by power supplied from the power generation unit 110. For example, the theft signal includes identification information that is uniquely assigned to each theft monitoring device 100. The theft signal is an example of the state signal of the present invention.

The power generation unit 110 performs vibration power generation by vibration transmitted from the bicycle body, rectifies power obtained by the vibration power generation, and output the power to the power controller 120. The power generation unit 110 can also charge the secondary battery 150 using the power obtained by the vibration power generation. The power generation unit 110 includes a vibration power generation element 111, a rectifying and smoothing AC/DC circuit 112, and a power storage element 113. The vibration power generation element 111 performs the vibration power generation by the vibration. The rectifying and smoothing AC/DC circuit 112 rectifies the power generated with the vibration power generation element 111, and outputs a DC current. The power generated with the vibration power generation element 111 is stored in the power storage element 113. When the power by which the power controller 120 is drivable is stored in the power storage element 113, the power storage element 113 supplies the stored power to the power controller 120. The power generation unit 110 is an example of the power generator of the present invention.

Figure 2A:
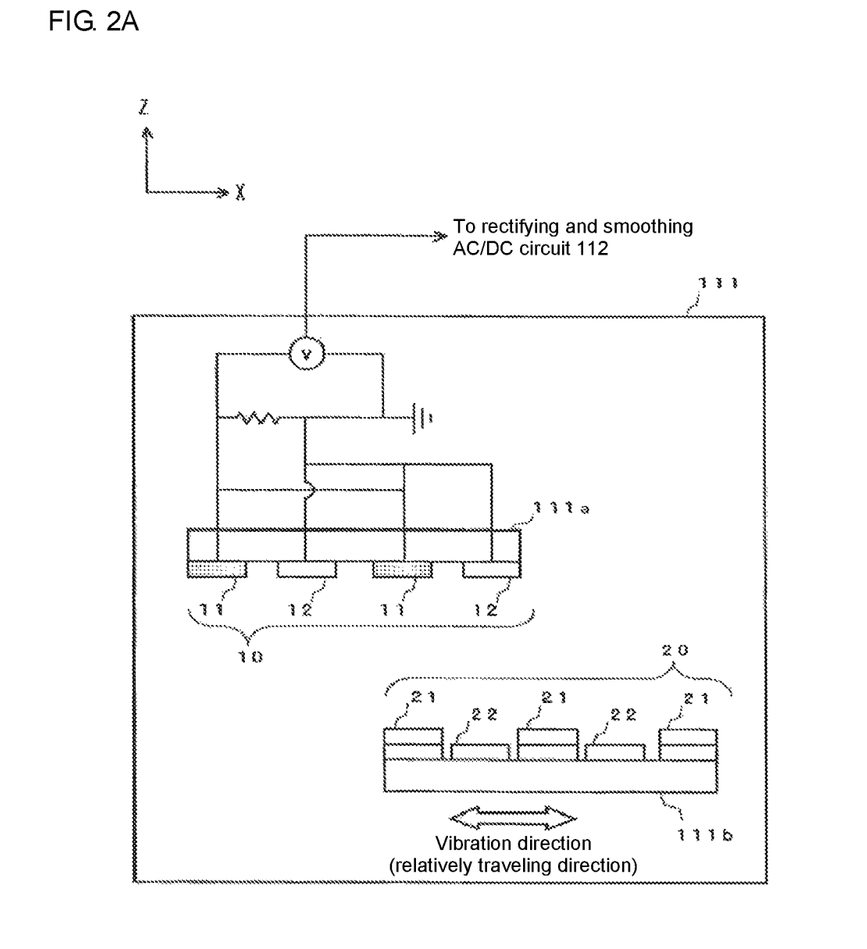
FIG. 2A is a view illustrating an example of a configuration of a vibration power generation element.
Figure 2B:
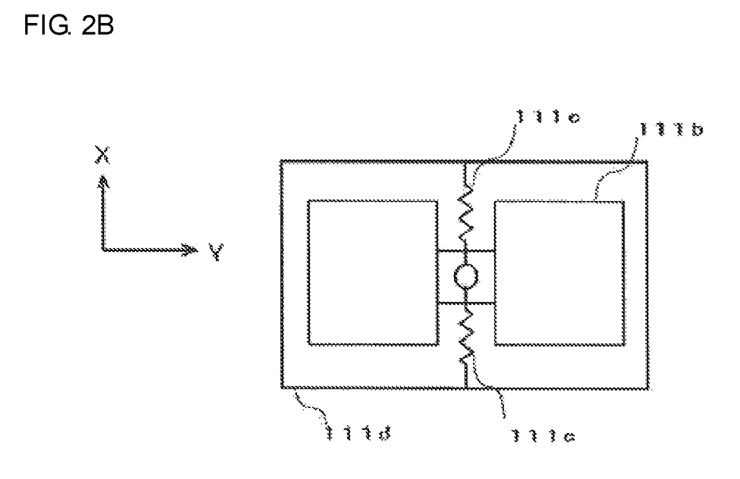
FIG. 2B is a view illustrating an example of the configuration of the vibration power generation element.

The vibration power generation element 111 performs the vibration power generation by electrostatic induction. FIGS. 2A and 2B are views illustrating an example of a configuration of the vibration power generation element 111. The configuration of the vibration power generation element 111 will be described with reference to FIGS. 2A and 2B. FIG. 2A illustrates configurations of an electrode group 10 and an electret group 20, which are provided in a metallic electrode substrate 111a and an electret electrode substrate 111b, respectively, in the vibration power generation element 111. In FIG. 2A, it is assumed that an X-direction is a direction in which electrets 21 and electrodes 11 are arrayed and a direction in which the electret electrode substrate 111b travels relative to the metallic electrode substrate 111a, that a Z-direction is a direction in which the metallic electrode substrate 111a and the electret electrode substrate 111b face each other, and that a Y-direction is a direction orthogonal to the X-direction and the Z-direction. FIG. 2A is a sectional view when the vibration power generation element 111 is cut on a ZX-plane. FIG. 2B is a view illustrating the vibration power generation element 111 cut on an XY-plane when the vibration power generation element 111 is viewed from a back side of the electret electrode substrate 111b.

The metallic electrode substrate 111a includes the electrode group 10 in a surface facing the electret electrode substrate 111b. The electrode group 10 includes plural small electrode groups each of which is constructed with a pair of electrodes (an electrode 11 and an electrode 12).

Electret electrode substrate 111b includes the electret group 20 in a surface facing the metallic electrode substrate 111a. The electret group 20 includes electrets 21 and guard electrodes 22. In the electret group 20, the electrets 21 and the guard electrodes 22 are alternately disposed. The electrets 21 semi-permanently hold a negative charge. For example, the electret electrode substrate 111b is fixed to a casing 111d using a spring 111c, whereby the electret electrode substrate 111b can travel relative to the metallic electrode substrate 111a.

In the case that an external vibration is provided to the vibration power generation element 111, resonance phenomena in which amplitude of the electret electrode substrate 111b is maximized for the metallic electrode substrate 111a because of a physical property is generated when the external vibration is at a predetermined frequency. The number of electrodes crossed by the electret on the side of the electret electrode substrate 111b increases per unit time when the amplitude of the electret electrode substrate 111b is maximized. Therefore, the power generation of the vibration power generation element 111 increases. Accordingly, from the viewpoint of power generation efficiency, preferably a resonance frequency (hereinafter, simply referred to as the resonance frequency of the vibration power generation element 111) of the electret electrode substrate 111b in the vibration power generation element 111 comes close to or agrees with the frequency of the external vibration as much as possible. The resonance frequency of the vibration power generation element 111 can be set to a desirable frequency by adjustment of a weight of the electret electrode substrate 111b and a spring constant of a spring 111c.

In the vibration power generation element 111 having the above configuration, electromotive force is generated between the electrodes 11 and 12 according to a positional variation (vibration) of the electret electrode substrate 111b relative to the metallic electrode substrate 111a of the electret electrode substrate 111b by the external vibration, and the power generation is performed. The generated power is rectified with the rectifying and smoothing AC/DC circuit 112.

The power controller 120 starts up the wireless controller 130 with the supply of the power from the power generation unit 110 as a trigger. For example, the power controller 120 supplies the power received from the power generation unit 110 to the wireless controller 130 to start up the wireless controller 130. For example, in the case that the power received from the power generation unit 110 is not enough to drive the wireless controller 130, the power controller 120 supplies the power received from the secondary battery 150 to the wireless controller 130, which allows the start-up of the wireless controller 130. The power controller is an example of the controller of the present invention.

The wireless controller 130 and the transmitter 140 wirelessly transmit the theft signal indicating the theft. The wireless controller 130 is started up by the supply of the power from the power controller 120, and drives the transmitter 140 to wirelessly transmit the theft signal. There is no particular limitation to a wireless communication scheme of transmitting the theft signal. Examples of the wireless communication scheme include Bluetooth (registered trademark), a mobile phone line such as long term evolution (LTE), and wireless LAN. The wireless controller 130 and the transmitter 140 are examples of the transmission unit of the present invention.

The secondary battery 150 supplies the power to the power controller 120. The secondary battery 150 is charged with the power generation unit 110. The secondary battery 150 can also supply the power to the acceleration sensor 160 through the power controller 120.

The acceleration sensor 160 detects acceleration generated in the bicycle to which the theft monitoring device 100 is fixed. For example, the wireless controller 130 and the transmitter 140 transmit information about the detected acceleration.

Figure 3:
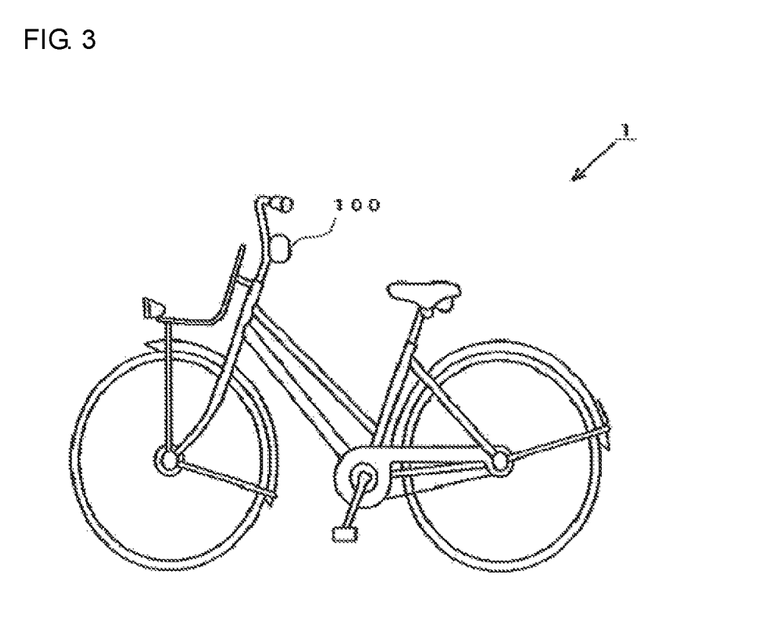
FIG. 3 is a view illustrating an example of a configuration in which the theft monitoring device is used in a bicycle.

The case that the theft monitoring device 100 is used to monitor the bicycle theft will be studied. FIG. 3 is a view illustrating an example of a configuration in which the theft monitoring device 100 is used in a bicycle 1. In FIG. 3, the theft monitoring device 100 is fixed to a handle of the bicycle 1. A position where the theft monitoring device 100 is fixed to the bicycle 1 is not limited to the handle of the bicycle 1. The theft monitoring device 100 may be fixed anywhere as long as a body vibration of the bicycle 1 is easily transmitted.

When the bicycle 1 runs, the power generation unit 110 of the theft monitoring device 100 performs the vibration power generation by the vibration transmitted from the body of the bicycle 1. The theft monitoring device 100 starts the wireless transmission of the theft signal by the power supplied by the vibration power generation.

In the vibration power generation element 111 included in the power generation unit 110 of the theft monitoring device 100, the resonance frequency of the vibration power generation element 111 can be adjusted by the adjustment of the spring constant of the spring 111c. Therefore, the vibration power generation element 111 synchronizes the vibration frequency at which the power is efficiently generated with the vibration frequency of the bicycle 1, which allows the theft monitoring device 100 to efficiently perform the wireless transmission. The vibration frequency detected in the body of the running bicycle 1 during a test run will be examined below.

In the test run, the acceleration sensor was attached to the bicycle 1, and the vibration frequency generated in the body of the bicycle 1 was detected. A position to which the acceleration sensor is attached is identical to the position in FIG. 3 to which the theft monitoring device 100 is fixed. In the test run, the bicycle 1 ran around the identical course three times. In the test run, it is assumed that an X-direction is a running direction of the bicycle 1, that a Z-direction is a direction from a ground toward a saddle of the bicycle 1, and that a Y-direction is a direction orthogonal to the X-direction and Z-direction.

Figure 4:
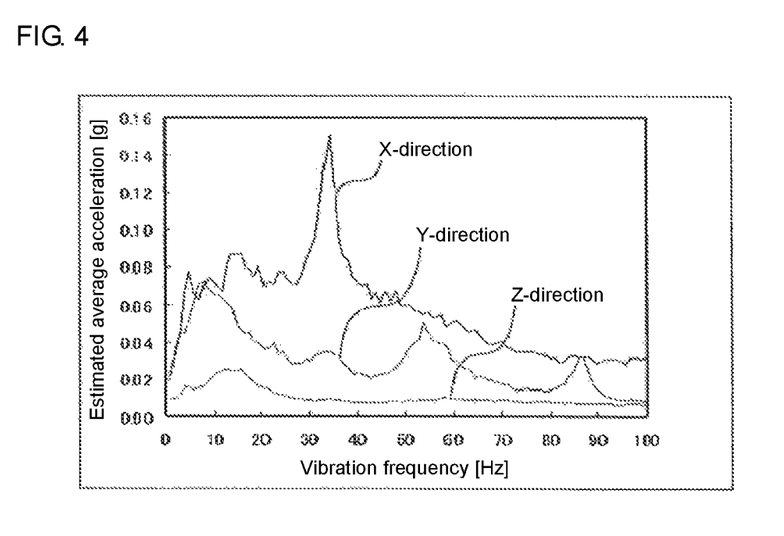
FIG. 4 is a view illustrating a vibration frequency when the bicycle provided with the theft monitoring device runs in a first round of a test run.

FIG. 4 is a view illustrating the vibration frequency when the bicycle 1 provided with the theft monitoring device 100 runs in a first round of the test run. A vertical axis in FIG. 4 indicates estimated average acceleration, and [g] is a unit of the estimated average acceleration based on standard gravity acceleration. A horizontal axis in FIG. 4 indicates the detected vibration frequency, and the detected vibration frequency has a unit of [Hz]. FIG. 4 illustrates vibration frequencies detected in the X-direction, Y-direction, and Z-direction. Referring to FIG. 4, the maximum acceleration of 0.15 g is generated in the X-direction at the vibration frequency of 34.2 Hz. FIG. 4 shows that the vibration in the X-direction is larger than the vibrations in the Y-direction and Z-direction.

Figure 5:
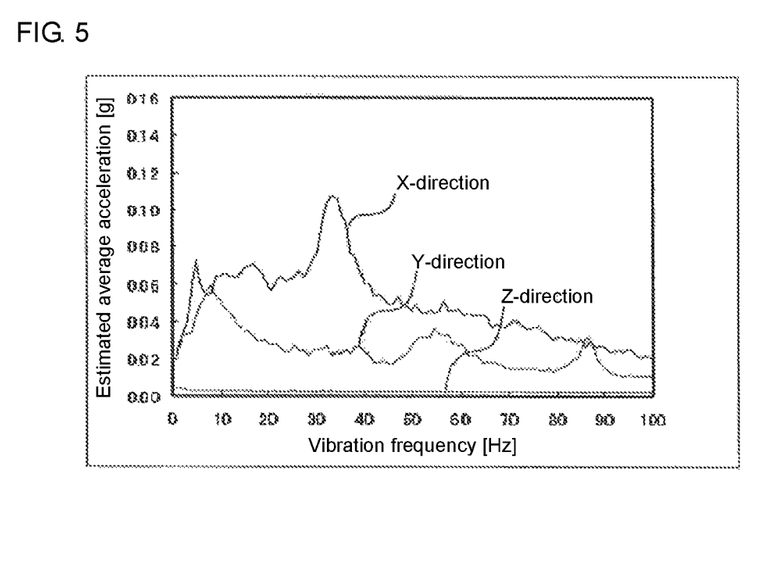
FIG. 5 is a view illustrating the vibration frequency when the bicycle provided with the theft monitoring device runs in a second round of the test run.

FIG. 5 is a view illustrating the vibration frequency when the bicycle 1 provided with the theft monitoring device 100 runs in a second round of the test run. Because the vertical and horizontal axes in FIG. 5 are similar to those in FIG. 4, the description will be omitted. Referring to FIG. 5, the maximum acceleration of 0.11 g is generated in the X-direction at the vibration frequency of 33.2 Hz to 34.2 Hz.

Similarly to FIG. 4, FIG. 5 shows that the vibration in the X-direction is larger than the vibrations in the Y-direction and Z-direction.

Figure 6:
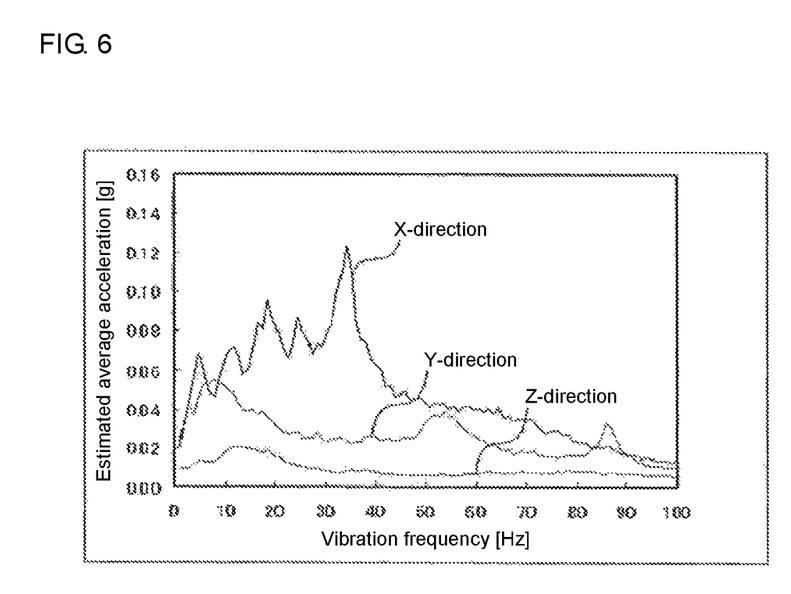
FIG. 6 is a view illustrating the vibration frequency when the bicycle provided with the theft monitoring device runs in a third round of the test run.

FIG. 6 is a view illustrating the vibration frequency when the bicycle 1 provided with the theft monitoring device 100 runs in a third round of the test run. Because the vertical and horizontal axes in FIG. 6 are similar to those in FIG. 4, the description will be omitted. Referring to FIG. 6, the maximum acceleration of 0.12 g is generated in the X-direction at the vibration frequency of 34.2 Hz. Similarly to FIG. 4, FIG. 6 shows that the vibration in the X-direction is larger than the vibrations in the Y-direction and Z-direction.

Referring to the results in FIGS. 4 to 6, among the vibrations generated in the running bicycle 1, the vibration in the X-direction is larger than the vibrations in other directions. The theft monitoring device 100 is fixed to the body of the bicycle 1 such that the vibration power generation is performed by the vibration in the X-direction, which enhances the power generation efficiency of the vibration power generation element 111. Therefore, preferably the theft monitoring device 100 is fixed to the body of the bicycle 1 such that the vibration direction of the electret electrode substrate 111b of the vibration power generation element 111 agrees with the X-direction (that is, the running direction of the bicycle 1).

In consideration of friction and the like in the vibration power generation element 111, preferably the acceleration of approximately at least 0.04 g is generated in the vibration power generation of the vibration power generation element 111. In examining the acceleration condition together with the results in FIGS. 4 to 6, preferably the resonance frequency of the vibration power generation element 111 is set to the range of 3 Hz to 70 Hz in the X-direction. When the resonance frequency of the vibration power generation element 111 is set to the range of 3 Hz to 70 Hz, the vibration power generation element 111 can efficiently perform the vibration power generation by the vibration transmitted from the body of the bicycle 1.

Figure 7:
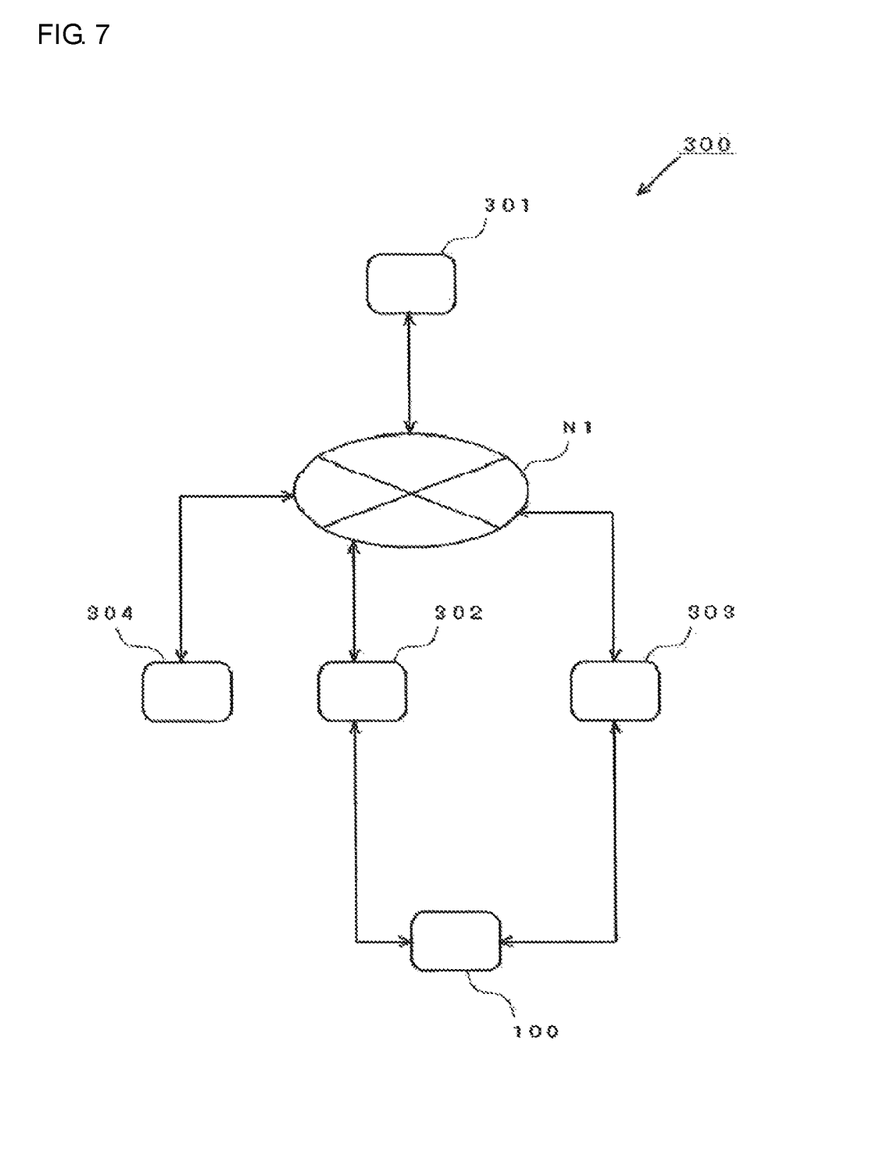
FIG. 7 is a view illustrating an example of a theft monitoring system in which the theft monitoring device is used.

A theft monitoring system in which the theft monitoring device 100 is used will be examined below. FIG. 7 illustrates an example of a theft monitoring system 300 in which the theft monitoring device 100 is used. The theft monitoring system 300 includes a server 301, a first receiver 302, a second receiver 303, a third receiver 304, a theft monitoring device 100, and a network N1.

In the theft monitoring system 300, the theft of the bicycle 1 to which the theft monitoring device 100 is fixed is monitored using the theft signal wirelessly transmitted from the theft monitoring device 100.

The theft monitoring device 100 is fixed to the bicycle 1. When the bicycle 1 runs, the power generation unit 110 of the theft monitoring device 100 performs the vibration power generation by the vibration transmitted from the body of the bicycle 1. The theft monitoring device 100 is started up by the power supplied from the power generation unit 110. The started-up theft monitoring device 100 wirelessly transmits the theft signal indicating the theft. The theft signal includes the identification information that is uniquely assigned to each theft monitoring device 100. The first receiver 302 or the second receiver 303 receives the transmitted theft signal.

The network N1 is a network that connects information processing devices to each other. There is no particular limitation to a communication scheme for the network N1. Both wireless and wired networks can be applied to the network N1. For example, the network N1 is the Internet.

The first receiver 302 is a receiver that is installed in each area. Examples of the first receiver 302 include an access point of a wireless LAN installed a user's house or a bicycle parking lot or a mobile-phone base station, a mobile-phone base station, and the like. Information indicating the position where the first receiver 302 is installed is stored in the first receiver 302. Both information about latitude and longitude and information uniquely assigned to each address or first receiver 302 can be used as the information indicating the position where the first receiver 302 is installed. When receiving the theft signal from the theft monitoring device 100, the first receiver 302 transmits the theft signal to the server 301 while adding positional information held by the first receiver 302 and time information about the time the theft signal is received to the theft signal. Hereinafter, information in which the positional information and the time information are added to the theft signal received from the theft monitoring device 100 is referred to as positional information about the bicycle 1 and the like. The first receiver 302 is an example of the relay device of the present invention. The positional information about the bicycle 1 and the like is an example of the state information of the present invention.

The second receiver 303 is a portable information processing device. Any information processing device may be used as the second receiver 303 as long as the information processing device can transmit and receive the information through the network N1. For example, the second receiver 303 can acquire the positional information about the second receiver 303 using a global positioning system (GPS). When receiving the theft signal from the theft monitoring device 100, the second receiver 303 transmits the theft signal to the server 301 while adding the positional information about the second receiver 303 and the time information about the time the theft signal is received to the theft signal. The second receiver 303 can acquire the positional information about the bicycle 1 and the like from the server 301. For example, the second receiver 303 is a smartphone. The second receiver 303 is an example of the relay device of the present invention.

The third receiver 304 is a portable information processing device. Any information processing device may be used as the third receiver 304 as long as the information processing device can transmit and receive the information through the network N1. The third receiver 304 can acquire the positional information about the bicycle 1 and the like from the server 301. For example, the third receiver 304 is a smartphone.

The server 301 is an information processing device that manages the theft monitoring system 300. The server 301 receives the positional information about the bicycle 1 and the like from the first receiver 302 or second receiver 303 through the network N1. When receiving the positional information about the bicycle 1 and the like from the first receiver 302 or second receiver 303, the server 301 stores information included in the positional information about the bicycle 1 and the like in the database. In the above configuration, it is conceivable that the server 301 receives the identical information from the first receiver 302 and second receiver 303. In such cases, the server 301 can store the previously-received information in the database, and cancel the subsequently-received information.

Figure 8:
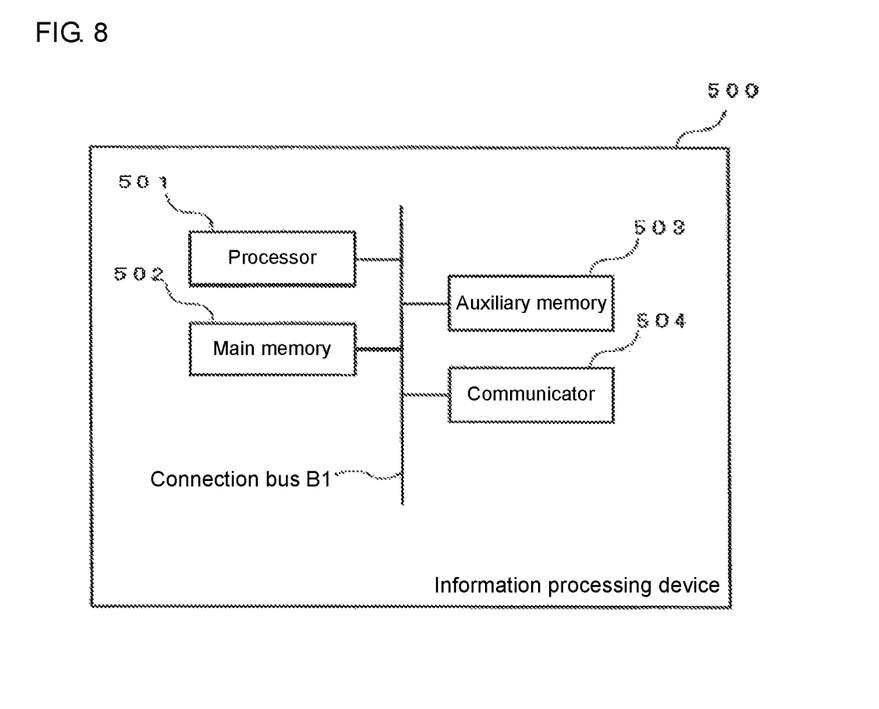
FIG. 8 is a view illustrating a hardware configuration of an information processing device.

A hardware configuration of the information processing device such as the server 301 will be described below. FIG. 8 is a view illustrating a hardware configuration of an information processing device 500. The information processing device 500 includes a processor 501, a main memory 502, an auxiliary memory 503, a communicator 504, and a connection bus B1. The processor 501, the main memory 502, the auxiliary memory 503, and the communicator 504 are connected to one another through the connection bus B1. The information processing device 500 can be used as the server 301, the first receiver 302, the second receiver 303, or the third receiver 304.

In the information processing device 500, the processor 501 expands a program stored in the auxiliary memory 503 into a work area of the main memory 502, and controls a peripheral device by execution of the program. Therefore, the information processing device 500 can perform processing suitable for a predetermined goal. The main memory 502 and the auxiliary memory 503 are a recording medium that is readable using the information processing device 500.

The main memory 502 is an example of the memory that can directly be accessed from the processor 501. The main memory 502 includes a random access memory (RAM) and a read only memory (ROM).

The auxiliary memory 503 readably and writably stores various program and various pieces of data in a recording medium. The auxiliary memory 503 is also called an external memory device. An operating system (OS), various programs, various tables are stored in the auxiliary memory 503. The OS includes a communication interface program transmitting and receiving data to and from an external device connected through the communicator 504. Examples of the external device include another information processing device and an external memory device, which are connected to the information processing device 500 through a computer network. For example, the auxiliary memory 503 may be a part of a cloud system that is of a computer group on the network.

Examples of the auxiliary memory 503 include an erasable programmable ROM (EPROM), a solid state drive (SSD), and a hard disk drive (HDD). Examples of the auxiliary memory 503 include a compact disk (CD) drive, a digital versatile disk (DVD) drive, and a Blu-ray (registered trademark) disk (BD) drive. The auxiliary memory 503 may be provided by a network attached storage (NAS) or a storage area network (SAN).

Information such as data and a program can be stored in the recording medium by electric, magnetic, optical, mechanical, or chemical action, and read with the information processing device 500. Examples of the recording medium detachable from the information processing device 500 include a flexible disk, a magneto-optical disk, a CD-ROM, a CD-R/W, a DVD, a Blu-ray disk, a DAT, an 8-mm tape, and a memory card such as a flash memory. Examples of the recording medium fixed to the information processing device 500 include a hard disk drive, an SSD, and a ROM.

For example, the communicator 504 is an interface with the network N1. The communicator 504 conducts communication with an external device through the network N1.

For example, the information processing device 500 may further include an input unit that receives an operating instruction from a user. Examples of the input unit include a keyboard, a pointing device, a touch panel, an acceleration sensor, and a voice-input device.

For example, the information processing device 500 may further include a positional information acquisition unit that acquires the positional information. A GPS can be cited as an example of the positional information acquisition unit.

For example, the information processing device 500 may include an output unit that outputs data processed with the processor 501 or data stored in the main memory 502. Examples of the output unit include a cathode ray tube (CRT) display, a liquid crystal display (LCD), a plasma display panel (PDP), an electroluminescence (EL) panel, an organic EL panel, and a printer.

Figure 9:
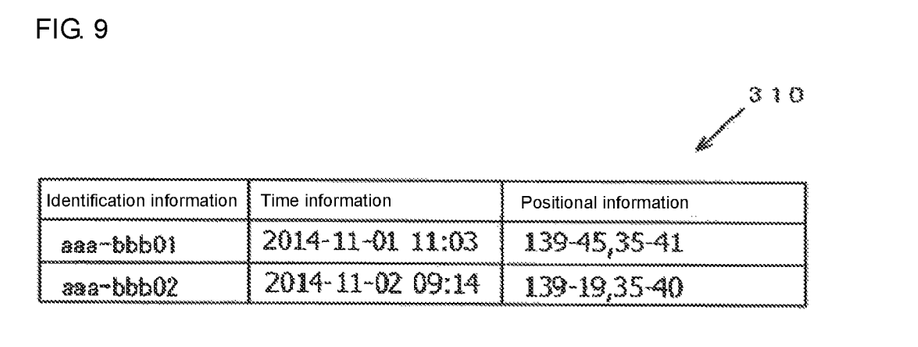
FIG. 9 is a view illustrating an example of information stored in a database of a server.

FIG. 9 is a view illustrating an example of theft information 310 stored in a database of a server 301. The theft information 310 stored in the database of the server 301 includes the identification information, the time information, and the positional information. The identification information uniquely assigned to each theft monitoring device 100 is stored in the identification information in FIG. 9. The time information provided from the first receiver 302 or second receiver 303 is stored in the time information in FIG. 9. The positional information provided from the first receiver 302 or second receiver 303 is stored in the positional information in FIG. 9. For example, as can be seen from FIG. 9, the bicycle 1 including the theft monitoring device 100 to which the identification information "aaa-bbb01" is assigned is located in "139 degrees 45 minutes east longitude and 35 degrees 41 minutes north latitude" at time "11:03 on Nov. 1, 2014".

Figure 10:
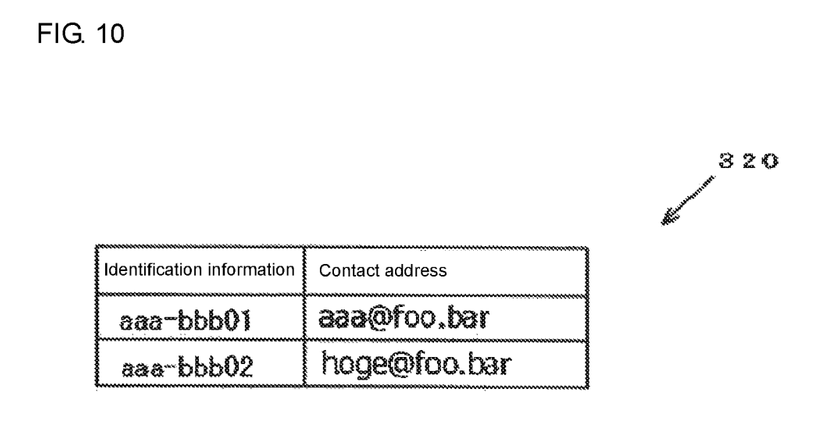
FIG. 10 is a view illustrating an example of contact address information registered in the server.

The server 301 can also transmit the information about the bicycle 1 to a contact address included in the previously-registered contact address information. FIG. 10 is a view illustrating an example of contact address information 320 registered in the server 301. Because the information stored in a field of the identification information is similar to that in FIG. 9, the description will be omitted. The contact address such as an e-mail address is stored in a field of the contact address. When receiving the positional information about the bicycle 1 and the like from the first receiver 302 or second receiver 303, the server 301 can refer to the contact address information 320, and notify the contact address, which is registered in the contact address information agreeing with the identification information included in the positional information about the bicycle 1 and the like. In FIG. 10, the e-mail address is illustrated as the information registered in the contact address. However, the information registered in the contact address is not limited to the e-mail address. The contact address information 320 is an example of the contact address information holding unit of the present invention.

As described above, in the theft monitoring system 300, the position of the first receiver 302 or second receiver 303, which receives the theft signal from the theft monitoring device 100, is dealt with as the position of the bicycle 1. Therefore, the theft monitoring system 300 can recognize the position of the bicycle 1 without providing the GPS in the theft monitoring device 100. However, this configuration does not prevent the theft monitoring device 100 from including the GPS.

<Modifications>

The theft monitoring device 100 of the embodiment includes one vibration power generation element 111. However, the number of vibration power generation elements 111 included in the theft monitoring device 100 is not limited to one. For example, the theft monitoring device 100 includes plural vibration power generation elements, which allows an increase of the power supplied by the vibration power generation. Resultantly, the theft monitoring device 100 can further include a sensor that requires larger power.

In another modification, the plural vibration power generation elements 111 can have different resonance frequencies. When the vibration power generation elements 111 have the different resonance frequencies, the theft monitoring device 100 can be operated by the vibration power generation in a wider range of a frequency band.

In still another modification, in the case that the vibration power generation element 111 can generate the power enough to drive the power controller 120, the power storage element 113 can be eliminated from the power generation unit 110.

In the theft monitoring device 100 of the embodiment, the bicycle is set to the monitoring target vehicle. However, the monitoring target vehicle of the state monitoring device of the present invention is not limited to the bicycle. The state monitoring device of the present invention can be used in various vehicles by an investigation of the vibration generated in the vehicle during the test run.

In the embodiment, the theft monitoring device 100 monitors the theft. However, the monitoring target vehicle state of the state monitoring device of the present invention is not limited to the theft. The state monitoring device of the present invention can monitor various states in which the vibration is generated in the vehicle. For example, the state monitoring device of the present invention can detect breaking open of a key for the monitoring target vehicle, movement of the vehicle, and damage or stain of the vehicle. That is, the state monitoring device of the present invention can also detect a prank on the vehicle.

DESCRIPTION OF SYMBOLS 100 theft monitoring device
110 power generation unit
111 vibration power generation element
112 rectifying and smoothing AC/DC circuit
113 power storage element
120 power controller
130 wireless controller
140 transmitter
150 secondary battery
300 theft monitoring system
301 server
302 first receiver
303 second receiver
304 third receiver
500 information processing device
N1 network

The invention claimed is:

1. A vehicle state monitoring device comprising:
a transmitter capable of wirelessly transmitting a state signal providing a notification of a vehicle state of a vehicle;
a power generator fixed to a vehicle body of the vehicle comprising a vibration power generation element that generates power by vibration from the vehicle body;
an acceleration sensor that measures acceleration of the vehicle; and
a controller configured to perform operations comprising:
starting up the transmitter when the power generated by the vibration power generation element is supplied from the power generator, and
causing the transmitter to wirelessly transmit the state signal, and
causing the transmitter to transmit the acceleration of the vehicle detected with the acceleration sensor by adding the acceleration of the vehicle to the state signal.

2. The vehicle state monitoring device according to claim 1, wherein a vibration direction of the vibration power generation element aligns with a running direction of the vehicle.

3. The vehicle state monitoring device according to claim 1, wherein a resonance frequency of the vibration power generation element ranges from 3 Hz to 70 Hz.

4. The vehicle state monitoring device according to claim 1, further comprising a secondary battery that drives the acceleration sensor.

5. The vehicle state monitoring device according to claim 4, wherein the power generator comprises a storage battery that accumulates the power of the vibration power generation, and
the secondary battery is charged with the power accumulated in the storage battery.

6. A vehicle state monitoring system comprising:
a server;
the vehicle state monitoring device according to claim 1; and
a relay device, wherein
when receiving the state signal transmitted from the vehicle state monitoring device, the relay device transmits state information in which time information indicating time the state signal is received and positional information indicating a position of the relay device are added to the received state signal to the server, and
the server comprises a database in which the state information is stored, the server providing the state information stored in the database in response to a request from a terminal device.

7. The vehicle state monitoring system according to claim 6, wherein the state signal comprises identification information that is uniquely assigned to each state monitoring device,
the server further comprises a contact address information holding unit storing the identification information and contact address information comprising a contact address of a user of the vehicle while associating the identification information and the contact address information with each other, and
when receiving the state information from the relay device, the server searches the contact address information holding unit with the identification information included in the state information as a key and notifies the contact address included in the contact address information associated with the identification information.

* * * * *